(12) United States Patent
Nishimura et al.

(10) Patent No.: US 9,979,059 B2
(45) Date of Patent: May 22, 2018

(54) ELECTRIC STORAGE APPARATUS

(71) Applicant: GS Yuasa International Ltd., Kyoto-shi (JP)

(72) Inventors: Yosuke Nishimura, Kyoto (JP); Jun Machida, Wako (JP); Sunao Teraguchi, Wako (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 329 days.

(21) Appl. No.: 14/495,609

(22) Filed: Sep. 24, 2014

(65) Prior Publication Data

US 2015/0086818 A1   Mar. 26, 2015

(30) Foreign Application Priority Data

Sep. 26, 2013  (JP) ................. 2013-199874

(51) Int. Cl.
*H01M 10/6567* (2014.01)
*H01M 10/625* (2014.01)
*H01M 2/10* (2006.01)

(52) U.S. Cl.
CPC ..... *H01M 10/6567* (2015.04); *H01M 2/1077* (2013.01); *H01M 10/625* (2015.04); *H01M 2220/20* (2013.01)

(58) Field of Classification Search
CPC .................................................. H01M 8/0273
See application file for complete search history.

(56) References Cited

U.S. PATENT DOCUMENTS

| 2012/0141855 A1 | 6/2012 | Okada et al. |
| 2012/0315508 A1* | 12/2012 | Kurita ................. H01M 2/1077 429/7 |
| 2013/0183571 A1 | 7/2013 | Miyazaki et al. |
| 2013/0323552 A1* | 12/2013 | Kurita ................. H01M 6/5038 429/90 |

FOREIGN PATENT DOCUMENTS

| JP | 2009-277471 A | 11/2009 |
| JP | 2012-123905 A | 6/2012 |
| JP | 2012-256465 A | 12/2012 |
| JP | 2012-256466 A | 12/2012 |
| JP | 2012-256467 A | 12/2012 |
| JP | 2013-251125 A | 12/2013 |
| JP | 2015-005356 A | 1/2015 |
| WO | WO 2012/043594 A1 | 4/2012 |
| WO | WO 2013/179797 A1 | 12/2013 |

OTHER PUBLICATIONS

Merriam-Webster Definitions.*

* cited by examiner

*Primary Examiner* — Sarah A. Slifka
*Assistant Examiner* — Brian R Ohara
(74) *Attorney, Agent, or Firm* — McGinn IP Law Group, PLLC

(57) ABSTRACT

Provided is an electric storage apparatus capable of preventing a decrease in its performance for cooling electric storage devices. An electric storage apparatus includes an electric storage device, an end holder adjacent to the electric storage device, a frame sandwiching the electric storage device and the end holder, and a seal member arranged between the frame and the end holder.

19 Claims, 12 Drawing Sheets

ELECTRIC STORAGE APPARATUS

CROSS-REFERENCE TO RELATED APPLICATION

This application claims the benefit of Japanese Patent Application No. 2013-199874, which is incorporated herein by reference.

FIELD

The present invention relates to an electric storage apparatus that is provided with electric storage devices.

BACKGROUND

Conventionally, electric storage apparatuses have been provided as a power source of various machines. Such an electric storage apparatus includes electric storage devices, end holders adjacent to the electric storage devices, and a frame sandwiching the electric storage devices and the end holders (for example, see JP 2012-123905 A).

The electric storage devices generate heat with charge and discharge. When excessive heat is generated, the electric storage devices suffer from a problem such as a decrease in their performance. Therefore, electric storage apparatuses generally have a configuration in which a fluid for cooling (hereinafter, referred to as cooling fluid) flows thereinside. Such an electric storage apparatus of this type is configured to suppress the generation of excessive heat in electric storage devices by exposing the electric storage devices to the cooling fluid.

However, the electric storage apparatus of this type has a portion in which the electric storage devices cannot be sufficiently cooled due to a structural reason. For example, in the electric storage apparatus in which a frame is provided as a separate body from end holders, there are gaps formed between the frame and the end holders.

Therefore, when the cooling fluid flows on the frame sides over the end holder sides, the amount of cooling fluid in contact with the electric storage devices is reduced. Accordingly, the performance for cooling the electric storage devices decreases depending on the flow of the cooling fluid in the aforementioned electric storage apparatus, which may result in a decrease in the performance of the electric storage devices, for example.

SUMMARY

In view of such an actual situation, it is an object of the present invention to provide an electric storage apparatus capable of preventing a decrease in its performance for cooling electric storage devices.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An electric storage apparatus according to an aspect of the present invention includes: an electric storage device; an end holder adjacent to the electric storage device; a frame sandwiching the electric storage device and the end holder; and a seal member arranged between the frame and the end holder.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
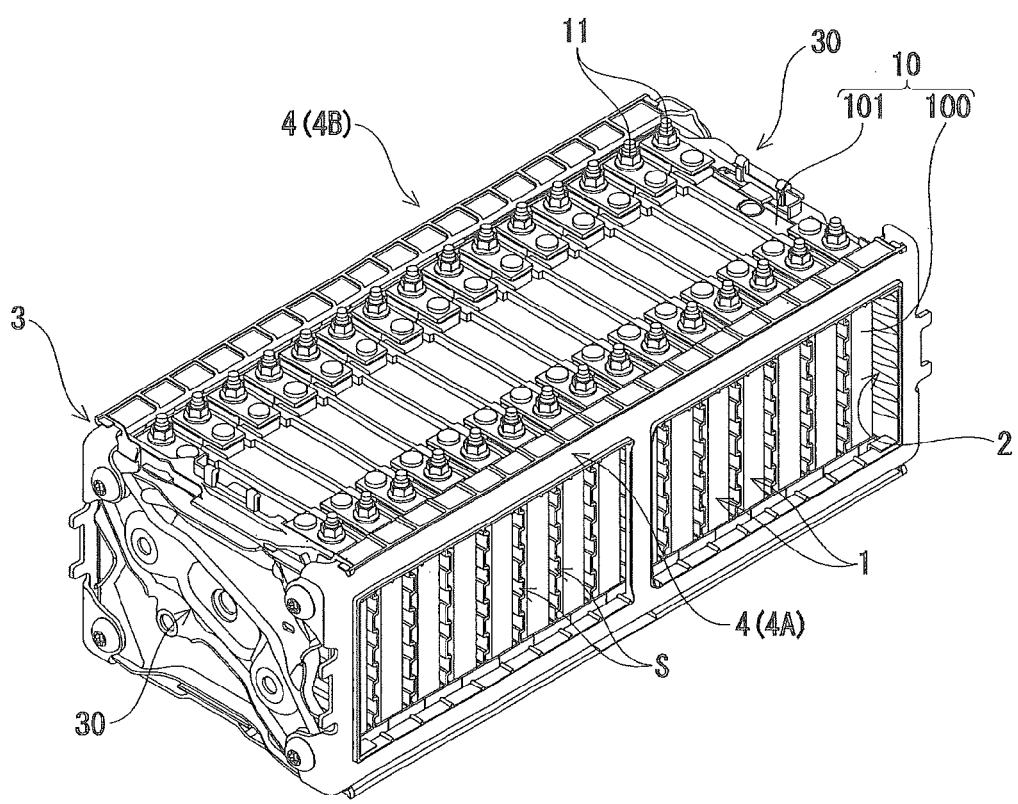
FIG. 1 shows an overall perspective view of a battery module according to an embodiment of the present invention.

The electric storage apparatus according to this embodiment includes: an electric storage device; an end holder adjacent to the electric storage device; a frame sandwiching the electric storage device and the end holder; and a seal member arranged between the frame and the end holder.

According to the electric storage apparatus having the aforementioned configuration, the end holder is adjacent to the electric storage device, and further the seal member is arranged between the end holder and the frame. Therefore, when a fluid for cooling the electric storage device (hereinafter, referred to as cooling fluid) attempts to flow on the frame side over the end holder, the seal member blocks the flow of the cooling fluid.

In this way, the electric storage apparatus suppresses the flow of the cooling fluid on the frame side over the end holder, and thus can suppress a reduction of the cooling fluid that is in contact with the electric storage device. Accordingly, it is possible to prevent a decrease in the performance for cooling the electric storage device.

The configuration may be such that the end holder has a holder body adjacent to the electric storage device, and the holder body has a flow path forming part that is formed on its surface facing the electric storage device.

In this way, it is possible to cool the electric storage device adjacent to the end holder more efficiently by allowing the cooling fluid to flow through the flow path forming part of the end holder.

The configuration may be such that the frame has an end plate facing the end holder, and the seal member is arranged between the end holder and the end plate in a first direction in which the end holder and the end plate are aligned.

In this way, the flow of the cooling fluid between the end holder and the end plate can be suppressed, so that the reduction of the cooling fluid that is in contact with the electric storage device can be suppressed. Accordingly, it is possible to prevent a decrease in the performance for cooling the electric storage device.

The configuration may be provided with a pair of the end holders, and may be such that the frame has a pair of the end plates, the pair of the end plates are arranged so as to sandwich the electric storage device and the end holders in the first direction, the end holders are arranged between the electric storage device and the respective end plates, and the seal member is arranged between each of the end plates and the end holder facing the end plate in the first direction.

In this way, the flow of the cooling gas between the pair of the end plates and the respective end holders facing the end plates can be suppressed, so that the reduction of the cooling fluid that is in contact with the electric storage device can be suppressed. Accordingly, it is possible to prevent a decrease in the performance for cooling the electric storage device.

The configuration may be such that the frame further has a frame part that is aligned together with the electric storage device in a second direction orthogonal to the first direction and that couples the pair of the end plates to each other, the frame part has a coupling part extending along a third direction that is orthogonal to both the first direction and the second direction, and the coupling part faces edges of the end holders in the second direction and covers boundaries between the end holders and the end plates.

Also in this way, the flow of the cooling gas between the pair of the end plates and the respective end holders adjacent to the end plates can be suppressed, so that the reduction of the cooling fluid that is in contact with the electric storage device can be suppressed. Accordingly, it is possible to prevent a decrease in the performance for cooling the electric storage device.

In this case, the configuration may be such that the seal member is arranged between the coupling part and each of the end holders and extends along the third direction.

In this way, the flow of the cooling fluid between the coupling part and the end holder can be suppressed, so that the reduction of the cooling fluid that is in contact with the electric storage device can be suppressed. Accordingly, it is possible to prevent a decrease in the performance for cooling the electric storage device.

The configuration may be such that the seal member is arranged between the edge of the end holder in the second direction that is orthogonal to the first direction and the edge of the end plate in the second direction, and the seal member extends along the third direction that is orthogonal to the first and second directions.

In this way, the area of the seal member that is in contact with the end holders and the end plates is increased. Therefore, the electric storage apparatus having the aforementioned configuration can suppress the flow of the cooling gas between the end holders and the end plates more reliably, and thus can suppress the reduction of the cooling fluid that is in contact with the electric storage device. Accordingly, it is possible to prevent a decrease in the performance for cooling the electric storage device more reliably.

The configuration may be further provided with an intervening member having insulating properties, the intervening member being arranged between the electric storage device and the frame, and may be such that the seal member is formed integrally with the intervening member.

In this way, it is possible to prevent a decrease in the performance for cooling the electric storage device by using the intervening member for insulating the electric storage device from the frame.

The configuration may be such that the seal member has insulating properties.

In this way, it is also possible to use the seal member for insulating the electric storage device from the frame while suppressing the reduction of the cooling fluid that is in contact with the electric storage device.

The configuration may be such that the seal member includes: a body arranged between the end holder and the frame; and a rib part formed so as to project from the body, wherein the rib part is formed on at least one of the end holder side of the body and the frame side of the body.

In this way, the electric storage apparatus can block the flow of the cooling fluid through the gap between the seal member (body) and the end holder using the rib part formed on the end holder side of the body. Further, the electric storage apparatus can block the flow of the cooling fluid through the gap between the seal member (body) and the frame using the rib part formed on the frame side of the body. Accordingly, the electric storage apparatus can prevent a decrease in its performance for cooling the electric storage device by suppressing the reduction of the cooling fluid that is in contact with the electric storage device.

The configuration may be such that the rib part has flexibility.

In this way, it is possible to allow the rib part and the end holder to be in tight contact more reliably. It is also possible to allow the rib part and the frame to be in tight contact more reliably.

As described above, the electric storage apparatus according to this embodiment can prevent a decrease in its performance for cooling the electric storage device.

Figure 2:
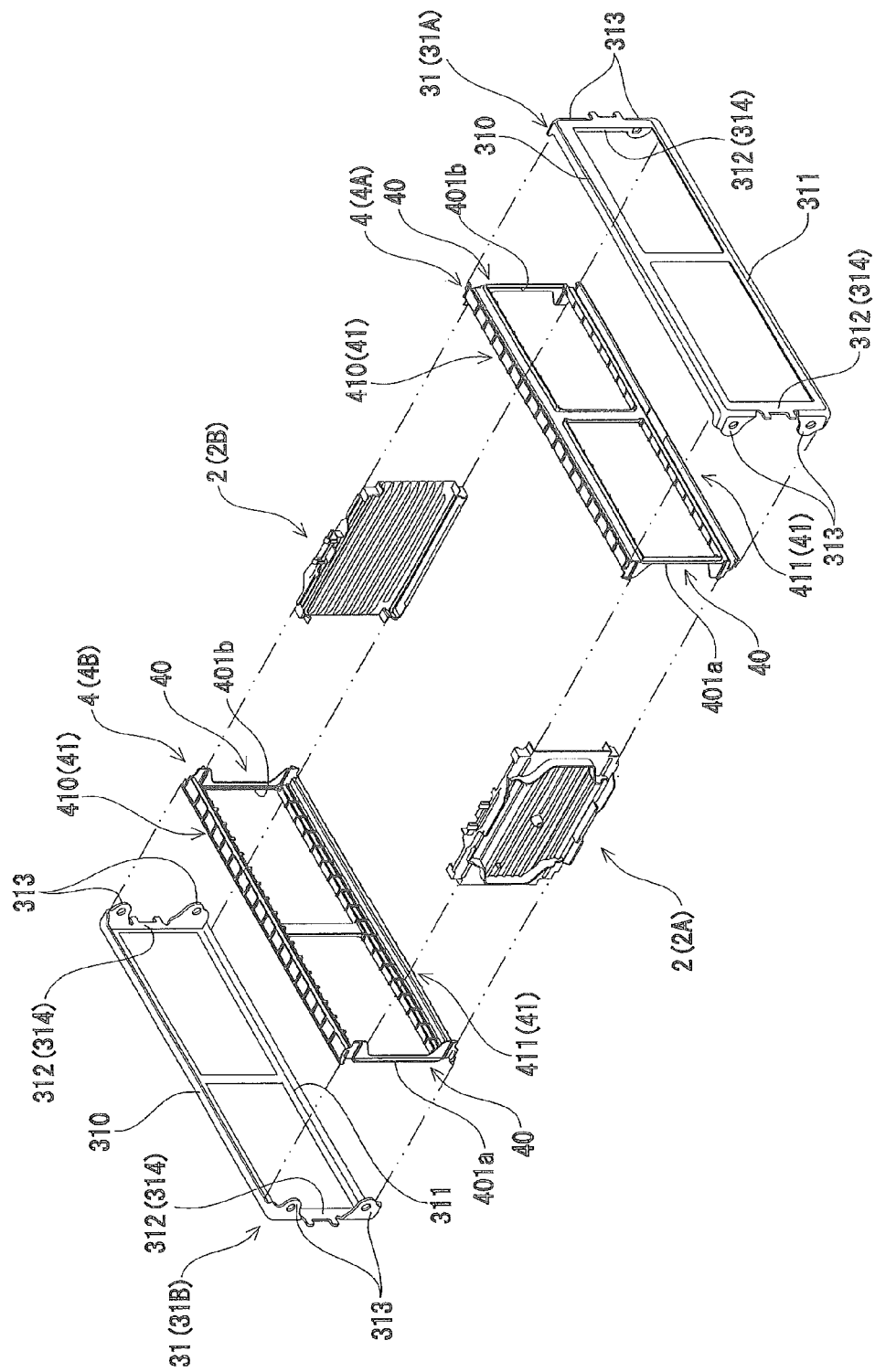
FIG. 2 shows a disassembled perspective view of the battery module according to the embodiment, in which end holders, frame parts, and intervening members are disassembled.

Hereinafter, a battery module that is an electric storage apparatus according to one aspect of an embodiment of the present invention is described with reference to the attached drawings. As shown in FIG. 1 and FIG. 2, the battery module includes electric storage devices 1 (see FIG. 1), end holders 2 adjacent to the electric storage devices 1, a frame 3 sandwiching the electric storage devices 1 and the end holders 2, and seal members 40 (see FIG. 2) arranged between the frame 3 and the end holders 2.

The battery module includes intervening members 4 (which are referred to as insulators in this embodiment) having insulating properties which are arranged between the frame 3 and the electric storage devices 1. The seal members 40 are configured as part of the insulators 4. The battery module includes a plurality of electric storage devices 1 aligned in a first direction. The battery module includes a plurality of spacers S (see FIG. 1) arranged between adjacent electric storage devices 1.

Each of the plurality of electric storage devices 1 has the same shape and the same structure. In the following description, one of the electric storage devices 1 is described.

As shown in FIG. 1, the electric storage device 1 includes a case 10 that houses an electrode assembly, outer gaskets that are arranged on an outer surface of the case 10 and are made of an insulating material such as resin, and external terminals 11 that pass through the outer gaskets. The electric storage device 1 includes a pair of outer gaskets and a pair of external terminals 11.

The case 10 has a case body 100 having an opening and a cover plate 101 that closes the opening of the case body 100. The case body 100 is formed to have a bottomed rectangular cylindrical shape with a dimension in a direction in which the plurality of electric storage devices 1 are aligned (hereinafter, referred to as first direction) smaller than a dimension in a direction orthogonal to the first direction (hereinafter, referred to as second direction). The cover plate 101 is formed into a rectangular shape corresponding to the opening of the case body 100.

One of the outer gaskets is arranged on one side in the longitudinal direction of the cover plate 101. The other of the outer gaskets is arranged on the other side in the longitudinal direction of the cover plate 101.

The end holders 2 are arranged at one end and the other end of the plurality of electric storage devices 1 in the first direction (direction in which the plurality of electric storage devices 1 are aligned). That is, the electric storage apparatus includes a pair of end holders 2. In the following description, a first end holder 2 arranged at one end of the plurality of electric storage devices 1 in the first direction may be denoted by "2A", and a second end holder 2 arranged at the other end of the electric storage devices 1 in the first direction may be denoted by "2B" (see FIG. 2).

Figure 3:
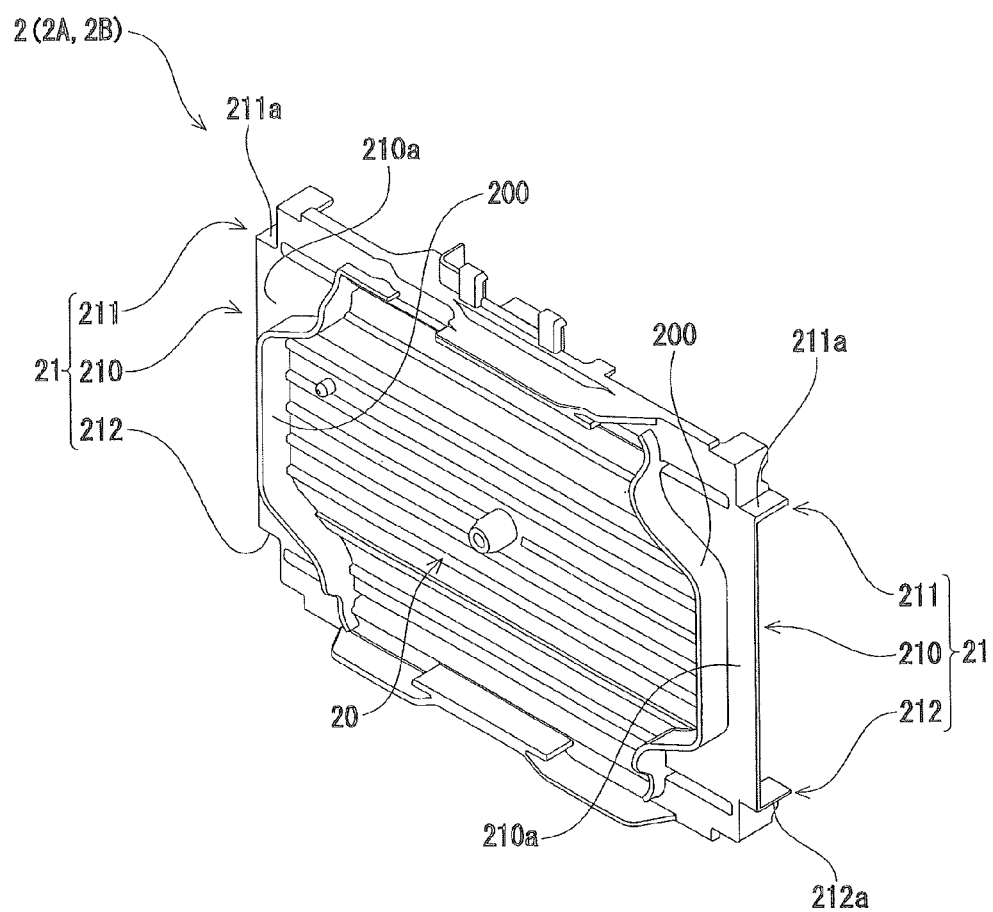
FIG. 3 shows a front perspective view of an end holder of the battery module according to the embodiment.
Figure 4:
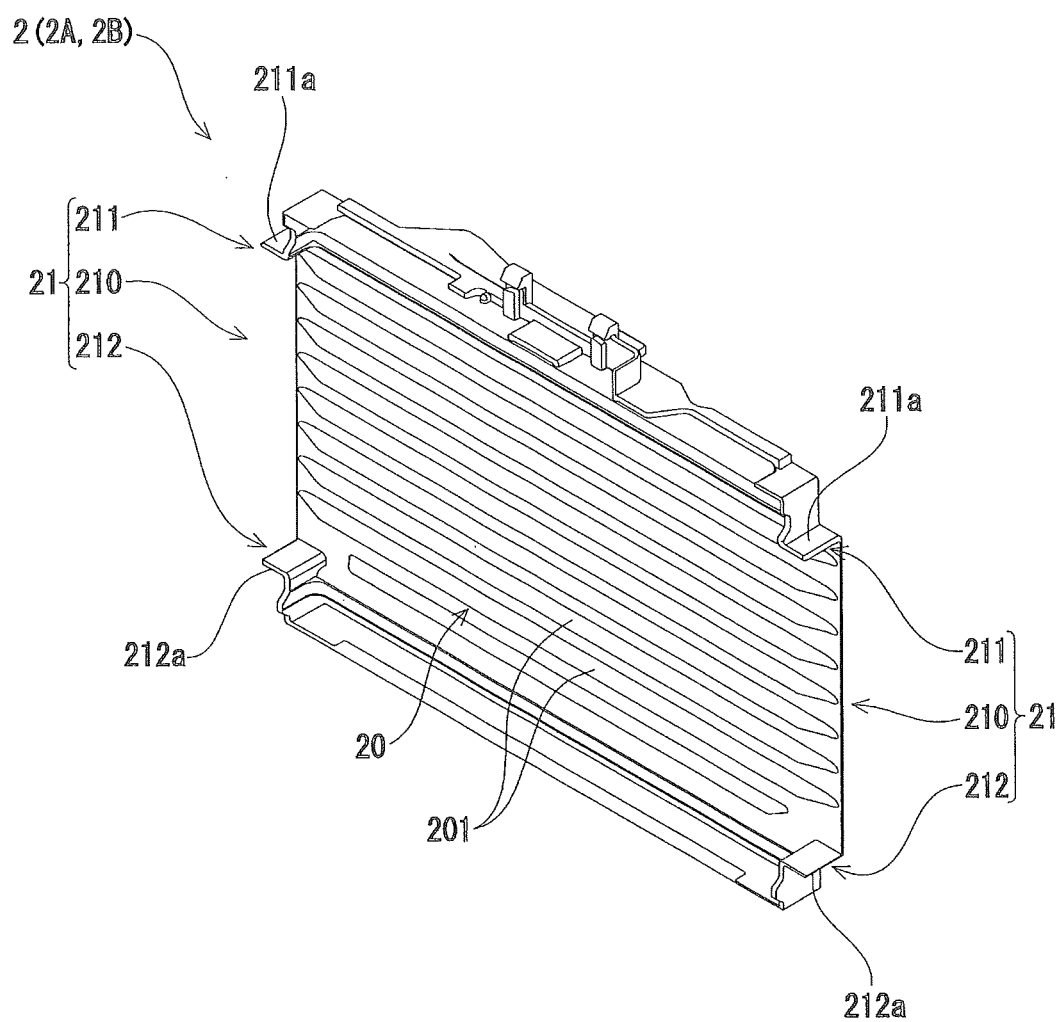
FIG. 4 shows a rear perspective view of the end holder of the battery module according to the embodiment.

As shown in FIG. 3 and FIG. 4, the first end holder 2A has a holder body 20 adjacent to the electric storage devices 1 in the first direction, and side end parts 21 formed on both sides of the holder body 20 in the second direction orthogonal to the first direction. The seal members 40 (insulators 4) are in tight contact with the side end parts 21.

The holder body 20 has partitions 200 (see FIG. 3) formed on one surface in the first direction and flow path forming parts 201 (see FIG. 4) formed on the other surface (surface facing the electric storage devices 1) in the first direction.

As shown in FIG. 3, a pair of partitions 200 are formed at an interval in the second direction. The partitions 200 are partition walls between the holder body 20 and the side end parts 21.

As shown in FIG. 4, the flow path forming parts 201 extend in the second direction. A plurality of flow path forming parts 201 are formed so as to be aligned at intervals in a direction orthogonal to both the first direction and the second direction (which is the up-down direction in FIG. 4, and is hereinafter referred to as third direction). That is, the holder body 20 has a plurality of flow path forming parts 201. In this electric storage apparatus, a space is formed between the electric storage device 1 adjacent to the end holder 2A and the flow path forming parts 201 of the holder body 20.

Returning to FIG. 3, the side end parts 21 are formed on one side of the holder body 20 in the second direction and on the other side of the holder body 20 in the second direction. That is, the end holder 2 has a pair of side end parts 21.

One of the side end parts 21 has a first abutting part 210 extending in the third direction (extending in parallel to the holder body 20) and a pair of second abutting parts 211 and 212 extending in the first direction from both ends of the first abutting part 210.

The first abutting part 210 has a first abutting surface 210a facing the frame 3 (end plate 30 to be described below) in the first direction. The second abutting part 211 has a second abutting surface 211a facing the frame 3 (first fringe part 310 to be described below) in the third direction. The second abutting part 212 has a second abutting surface 212a facing the frame 3 (second fringe part 311 to be described below) in the third direction.

The other of the side end parts 21 has a first abutting part 210 extending in the third direction (extending in parallel to the holder body 20) and a pair of second abutting parts 211 and 212 extending in the first direction from both ends of the first abutting part 210.

The first abutting part 210 has a first abutting surface 210a facing the frame 3 (end plate 30 to be described below) in the first direction. The second abutting part 211 has a second abutting surface 211a facing the frame 3 (first fringe part 310 to be described below) in the third direction. The second abutting part 212 has a second abutting surface 212a facing the frame 3 (second fringe part 311 to be described below) in the third direction (see FIG. 4).

The other end holder 2B has the same configuration as the first end holder 2A. The pair of end holders 2A and 2B are arranged so that their flow path forming parts 201 face each other.

As shown in FIG. 1, the frame 3 has end plates 30 facing (adjacent to) the end holders 2 (2A and 2B). That is, the frame 3 has a pair of end plates 30, where one of the end plates 30 is adjacent to the first end holder 2A, and the other of the end plates 30 is adjacent to the other end holder 2B (note that only one of the end plates 30 is shown in FIG. 1).

Though not shown in FIG. 1, the end plate 30 has a pair of screw holes formed on one side in the first direction at an interval in the third direction. Further, the end plate 30 has a pair of screw holes formed on the other side in the first direction at an interval in the third direction.

The pair of end plates 30 shown in FIG. 1 are coupled to each other by frame parts 31 shown in FIG. 2. The frame parts 31 are arranged on both sides of the electric storage devices 1 in the second direction.

As shown in FIG. 2, each of the frame parts 31 has a first fringe part 310 that extends in the first direction and is arranged on the cover plate 101 side of the electric storage devices 1, and a second fringe part 311 that extends in the first direction and is arranged on the bottom side of the electric storage devices 1 (on the opposite side of the cover plate 101 side). The frame part 31 has third fringe parts 312 (coupling parts 314) formed extending between the first fringe part 310 and the second fringe part 311. Further, the frame part 31 has fixing parts 313 arranged on the outer sides of the end plates 30 in the first direction. The coupling parts 314 extend in the third direction along the edges of the end holders 2.

The first fringe part 310 is elongated in the first direction. The first fringe part 310 is bent along its longitudinal direction. Therefore, one side of the first fringe part 310 bounded by the bent portion is arranged on the cover plates 101 of the electric storage devices 1, and the other side thereof bounded by the bent portion is arranged on the side surfaces of the electric storage devices 1.

The second fringe part 311 is elongated in the first direction. The second fringe part 311 is bent along its longitudinal direction. Therefore, one side of the second fringe part 311 bounded by the bent portion is arranged on the bottom surfaces of the electric storage devices 1, and the other side thereof bounded by the bent portion is arranged on the side surfaces of the electric storage devices 1.

The third fringe parts 312 are formed on one side in the longitudinal direction of the first fringe part 310 (one side in the longitudinal direction of the second fringe part 311) and on the other side in the longitudinal direction of the first fringe part 310 (the other side in the longitudinal direction of the second fringe part 311). That is, the frame part 31 has a pair of third fringe parts 312.

The fixing parts 313 are formed at both ends in the longitudinal direction of the first fringe part 310. The fixing parts 313 are also formed at both ends in the longitudinal direction of the second fringe part 311.

Each of the fixing parts 313 has a through hole (not shown). In the electric storage apparatus, when bolts inserted through the through holes of the fixing parts 313 are threadedly engaged with the end plates 30, the end holders 2 are pressed by the tips of the bolts B. Thus, the electric storage apparatus allows compressive forces to act on the plurality of electric storage devices 1 due to the bolts inserted through the through holes of the fixing parts 313.

The coupling parts 314 cover the boundaries between the end holders 2 and the end plates 30. The coupling parts 314 are formed so as to partially extend from the outer sides of the end plates 30 toward the end holders 2. In this embodiment, the third fringe parts 312 of the frame parts 31 serve as the coupling parts 314.

In this embodiment, one of the frame parts 31 is arranged on one side of the electric storage devices 1 in the second direction, and the other of the frame parts 31 is arranged on the other side of the electric storage devices 1 in the second direction. In the following description, one of the frame parts 31 may be denoted by "31A", and the other of the frame parts 31 may be denoted by "31B" (see FIG. 2).

The insulators 4 are arranged on both sides of the electric storage devices 1 in the second direction. That is, the electric storage apparatus has a pair of insulators 4 as shown in FIG. 2.

The insulators 4 have the seal members 40, and externally fitted parts 41 that are externally fitted to the frame parts 31 (31A and 31B) of the frame 3. As described above, the seal members 40 are configured to serve as part of the insulators 4 (that is, the seal members 40 and the externally fitted parts 41 are integrally formed) in this embodiment. The seal members 40 and the externally fitted parts 41 have insulating properties.

Figure 5:
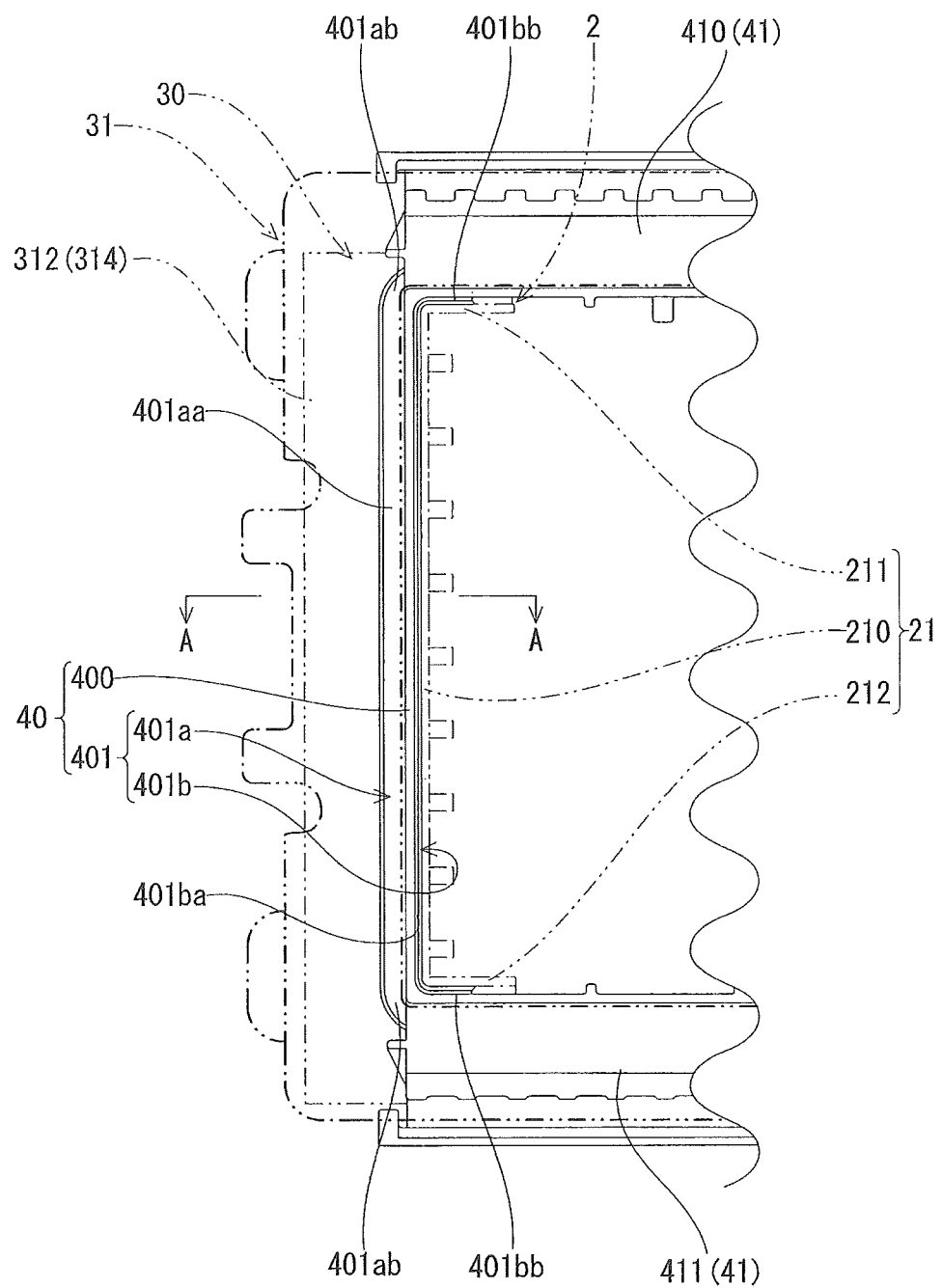
FIG. 5 shows a side view of an insulator of the battery module according to the embodiment.
Figure 10:
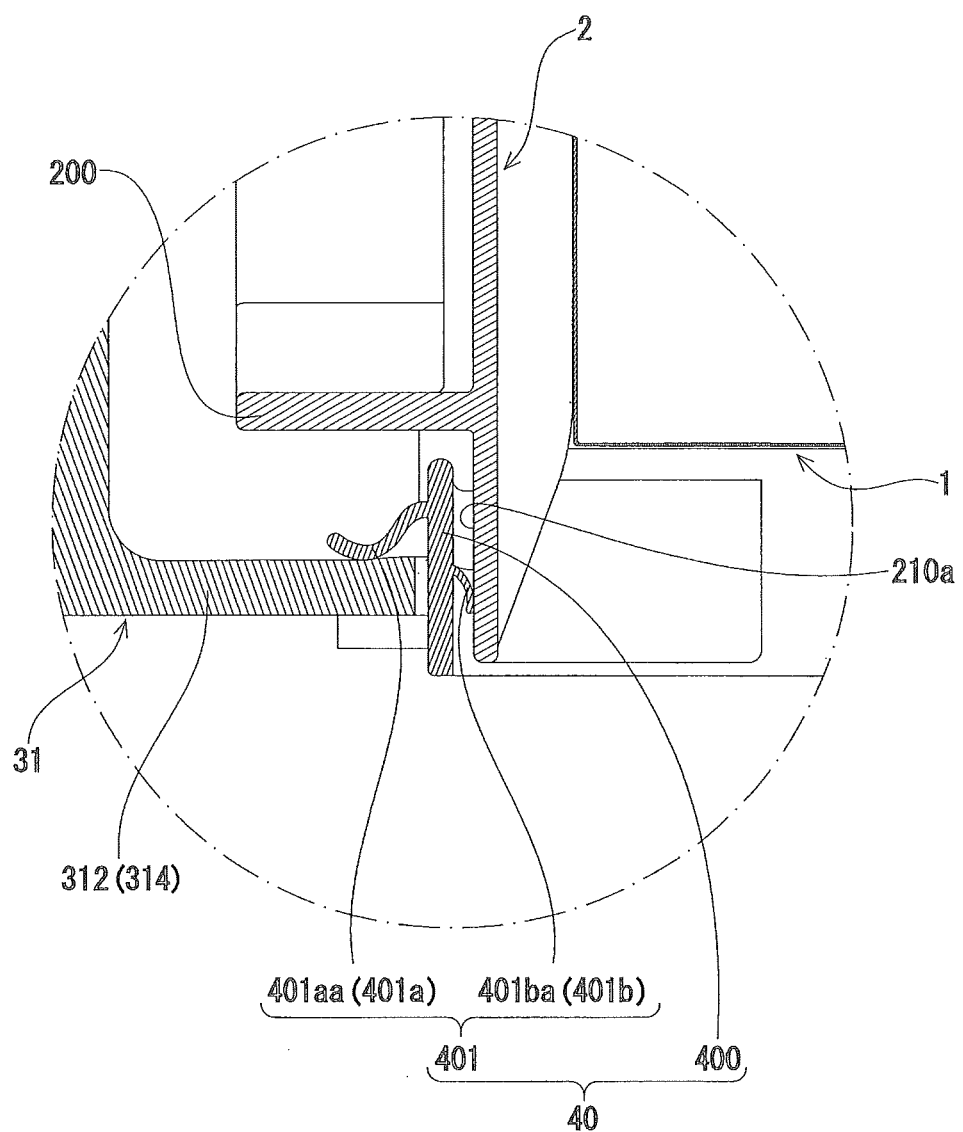
FIG. 10 shows a sectional view, taken along the line A-A in FIG. 5, of the battery module according to the embodiment.

As shown in FIG. 5 and FIG. 10, the seal members 40 include bodies 400 arranged between the end holders 2 and the frame parts 31 (31A and 31B) of the frame 3, and rib parts 401 formed in the bodies 400.

Each of the bodies 400 is elongated in the third direction. Each of the rib parts 401 is formed to project from the body 400, and is formed on at least one of the end holder 2 side of the body 400 and the frame part 31 side of the body 400.

In the seal members 40 according to this embodiment, the rib parts 401 are formed respectively on the end holder 2 side of the body 400 and on the frame part 31 side of the body 400. In the following description, a rib part 401 formed on the frame part 31 side of the body 400 is referred to as first rib part 401*a*, and a rib part 401 formed on the end holder 2 side of the body 400 is referred to as second rib part 401*b*.

Figure 6:
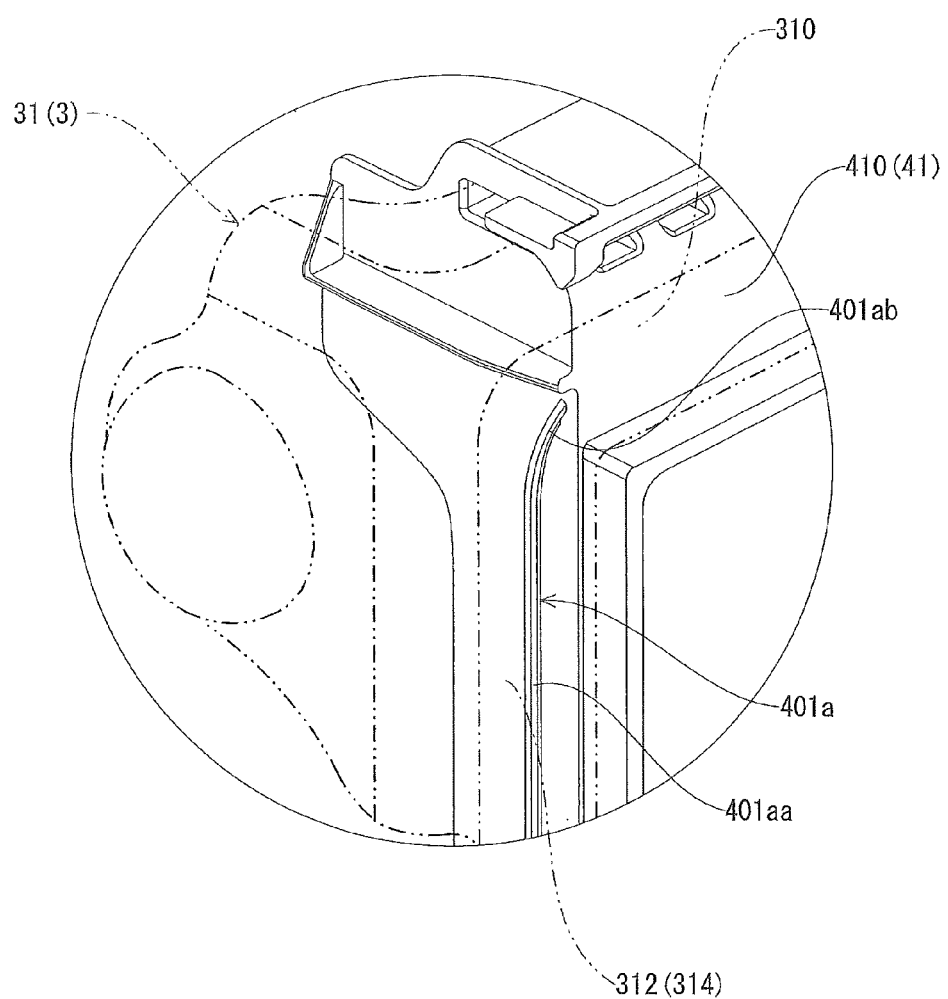
FIG. 6 shows a perspective view of the insulator of the battery module according to the embodiment, in a region in the vicinity of one curved part of a first rib part.
Figure 7:
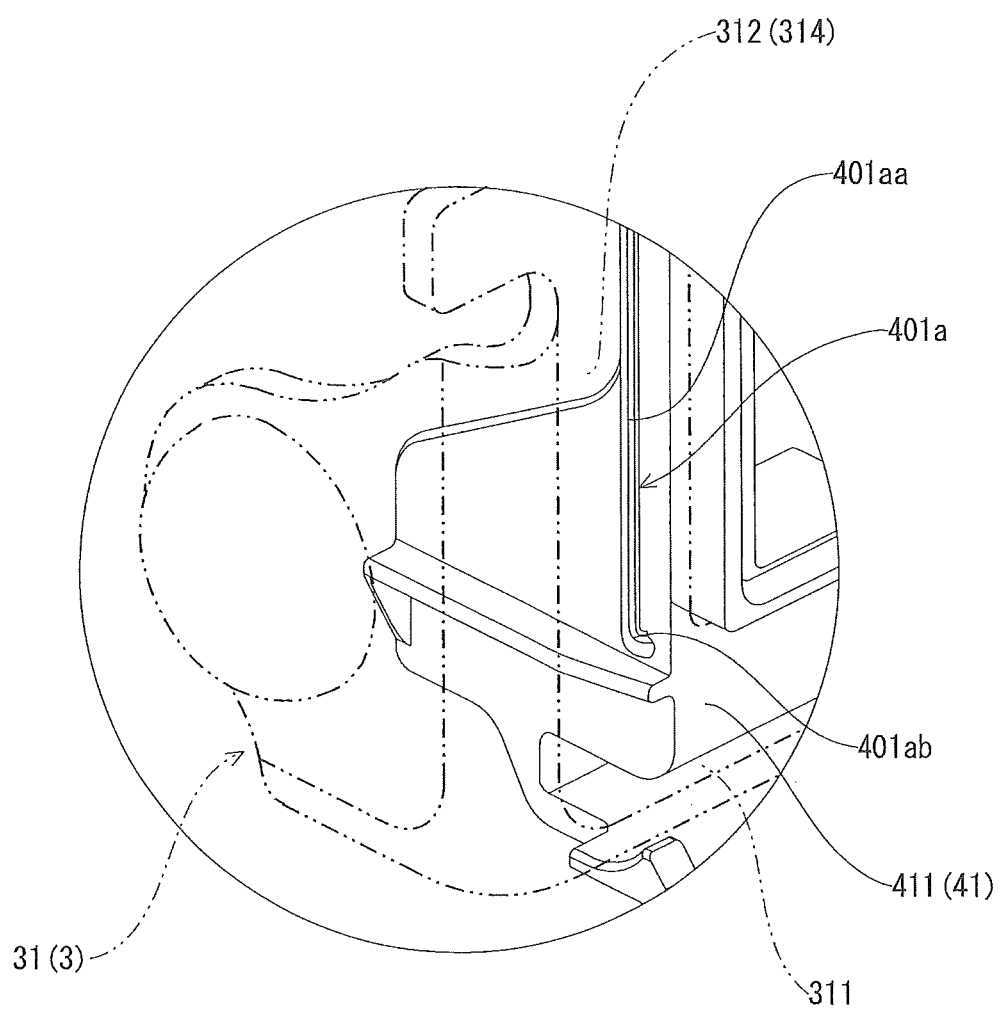
FIG. 7 shows a perspective view of the insulator of the battery module according to the embodiment, in a region in the vicinity of the other curved part of the first rib part.

The first rib part 401*a* has flexibility. As shown in FIG. 6, FIG. 7, and FIG. 10, the first rib part 401*a* has a linear part 401*aa* that is elongated in the third direction. Further, the first rib part 401*a* has a pair of curved parts 401*ab* extending from both ends in the longitudinal direction of the linear part 401*aa* while curving in the first direction. As described above, FIG. 10 is a sectional view taken along the line A-A in FIG. 5. That is, FIG. 10 is a view of a cut surface, as seen from above, when the insulator 4 is cut along the first direction.

The linear part 401*aa* is formed to have an S-shaped cross section in a direction orthogonal to the longitudinal direction (see FIG. 10). A more specific description is given. The linear part 401*aa* has a proximal end on the body 400 side and a distal end on the opposite side of the proximal end. The linear part 401*aa* is formed so that the distal end is located more on the frame part 31 side than the proximal end. Therefore, the first rib part 401*a* is pressed against the frame 3 on its distal end side (the coupling part 314 of the frame part 31).

Each of the curved parts 401*ab* is formed to have an S-shaped cross section in a direction orthogonal to a direction in which it extends. The curved part 401*ab* has a proximal end on the body 400 side and a distal end on the opposite side of the proximal end. The curved part 401*ab* is formed so that the distal end is located more on the frame part 31 side than the proximal end. Therefore, the first rib part 401*a* is pressed against the frame 3 on its distal end side (the coupling part 314 of the frame part 31).

Figure 8:
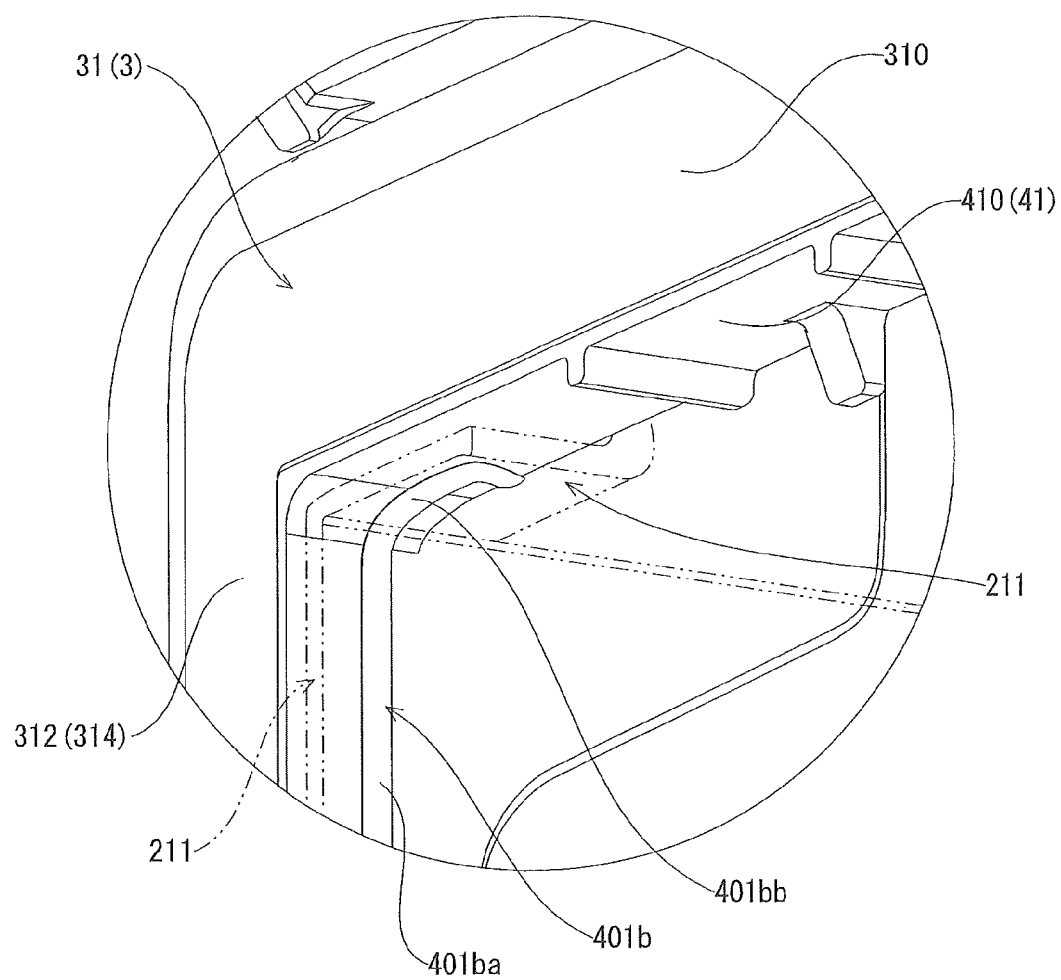
FIG. 8 shows a perspective view of the insulator of the battery module according to the embodiment, in a region in the vicinity of one curved part of a second rib part.
Figure 9:
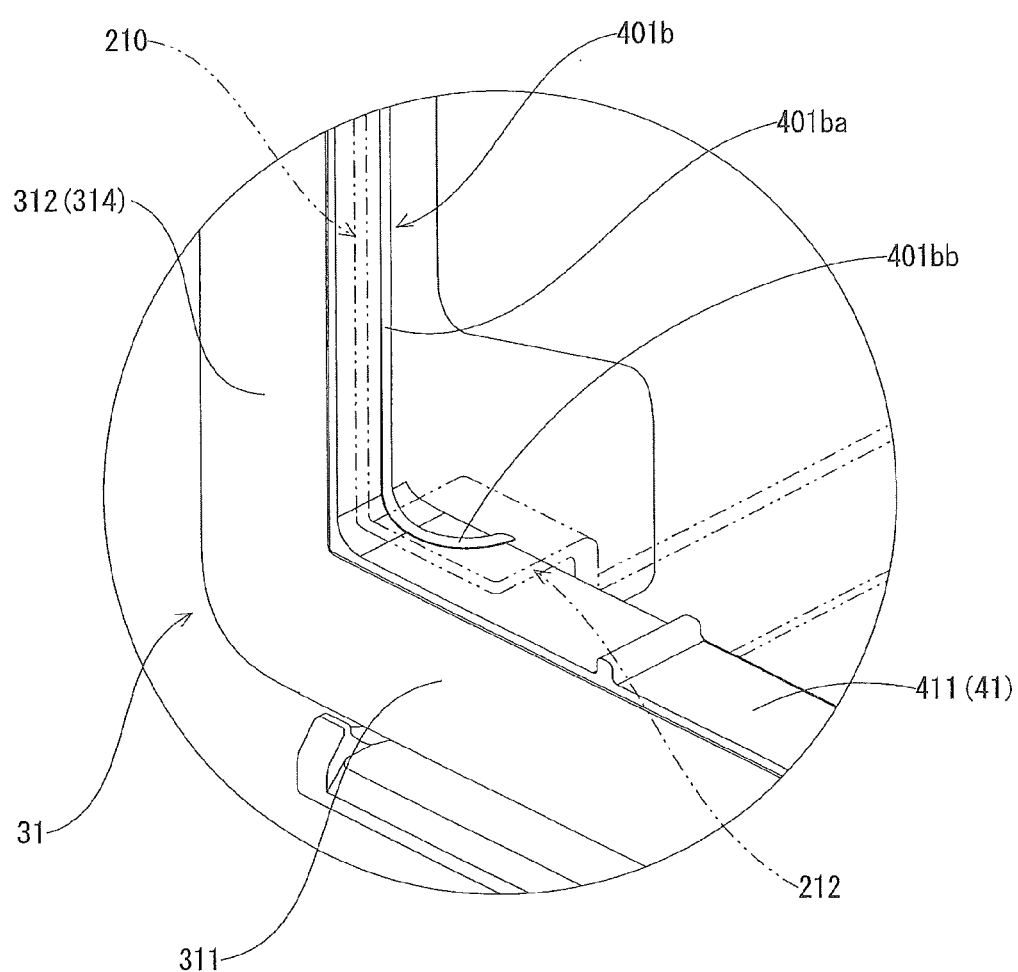
FIG. 9 shows a perspective view of the insulator of the battery module according to the embodiment, in a region in the vicinity of the other curved part of the second rib part.

The second rib part 401*b* has flexibility. As shown in FIG. 8, FIG. 9 and FIG. 10, the second rib part 401*b* has a linear part 401*ba* that is elongated in the third direction. Further, the second rib part 401*b* has a pair of curved parts 401*bb* extending from both ends in the longitudinal direction of the linear part 401*ba* while curving in the first direction.

The linear part 401*ba* has a proximal end on the body 400 side and a distal end on the opposite side of the proximal end. The linear part 401*ba* is formed so that the distal end is located more on the end holder 2 side than the proximal end (so that the distal end extends away from the body 400). Therefore, the second rib part 401*b* is pressed against the end holder 2 (the first abutting surface 210*a* of the first abutting part 210 of the side end part 21) on its distal end side (see FIG. 10).

Each of the curved parts 401*bb* has a proximal end on the body 400 side and a distal end on the opposite side of the proximal end. The curved part 401*bb* is formed so that the distal end is located more on the end holder 2 side than the proximal end (so that the distal end extends away from the body 400). Therefore, one of the curved parts 401*bb* of the second rib part 401*b* is pressed against the end holder 2 (the second abutting surface 211*a* of the second abutting part 211 of the side end part 21) on its distal end side. The other of the curved parts 401*bb* of the second rib part 401*b* is pressed against the end holder 2 (the second abutting surface 212*a* of the second abutting part 211 of the side end part 21) on its distal end side.

As shown in FIG. 2, the externally fitted part 41 has a first externally fitted part 410 that is externally fitted to the first fringe part 310 and a second externally fitted part 411 that is externally fitted to the second fringe part 311.

As described above, in the battery module according to this embodiment, the pair of insulators 4 are arranged respectively on both sides of the electric storage devices 1 in the second direction. That is, one of the insulators 4 is arranged on one side of the electric storage devices 1 in the second direction. Therefore, the seal members 40 of the insulator 4 are arranged between the frame part 31A of the frame 3 and the end holders 2 (2A and 2B), and the externally fitted part 41 of the insulator 4 is externally fitted to the frame part 31A of the frame 3.

The seal members 40 of the other of the insulators 4 are arranged between the frame part 31B of the frame 3 and the end holders 2 (2A and 2B), and the externally fitted part 41 of the insulator 4 is externally fitted to the frame part 31B of the frame 3. In the following description, one of the insulators 4 may be referred to as "4A", and the other of the insulators 4 may be referred to as "4B".

Each of the plurality of spacers S is formed to have a square wave shape in side view. Therefore, spaces extending along the second direction are formed between the electric storage devices 1 and the spacers S.

The electric storage apparatus according to this embodiment is as described above. Subsequently, the flow of the cooling fluid (fluid for cooling the electric storage devices 1) in the electric storage apparatus is described with reference to the attached drawings.

Figure 11:
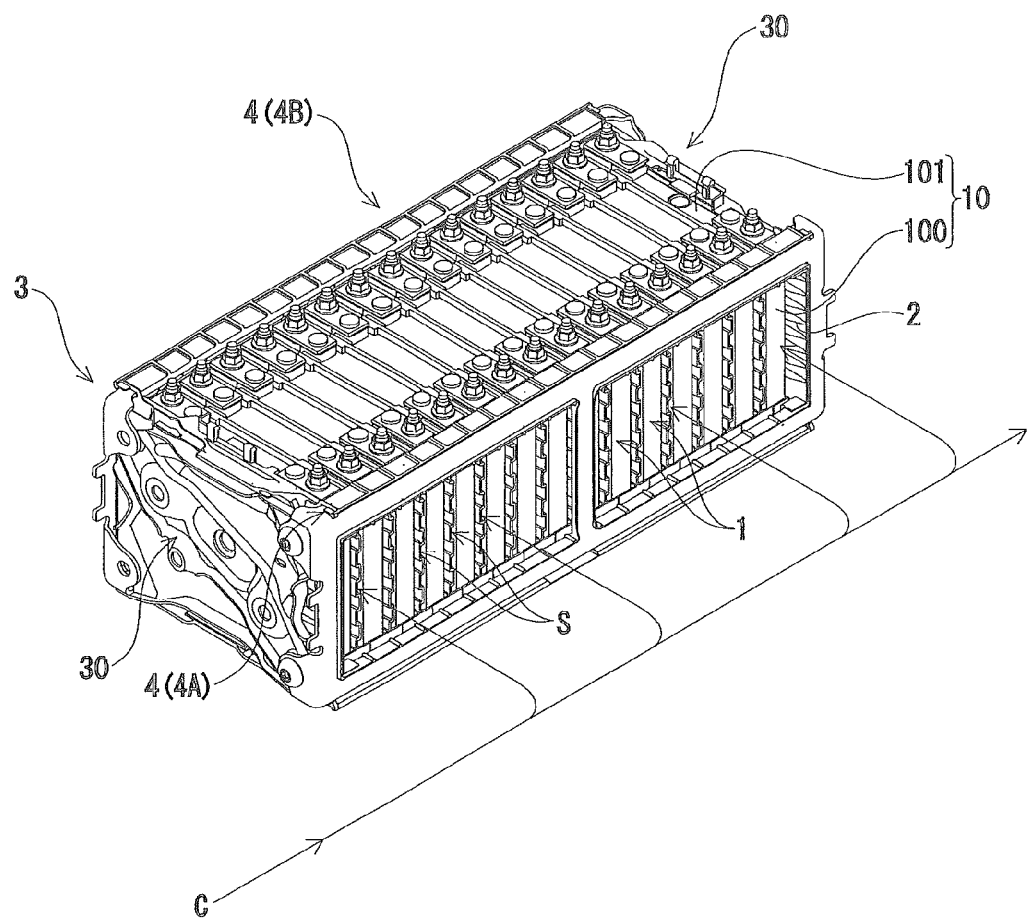
FIG. 11 is an explanatory diagram illustrating the flow of a cooling fluid in the battery module according to the embodiment.

The cooling fluid C flowing around the electric storage apparatus inflows between the spacers S and the electric storage devices 1 and between the electric storage devices 1 and the end holders 2, as shown in FIG. 11.

Figure 12:
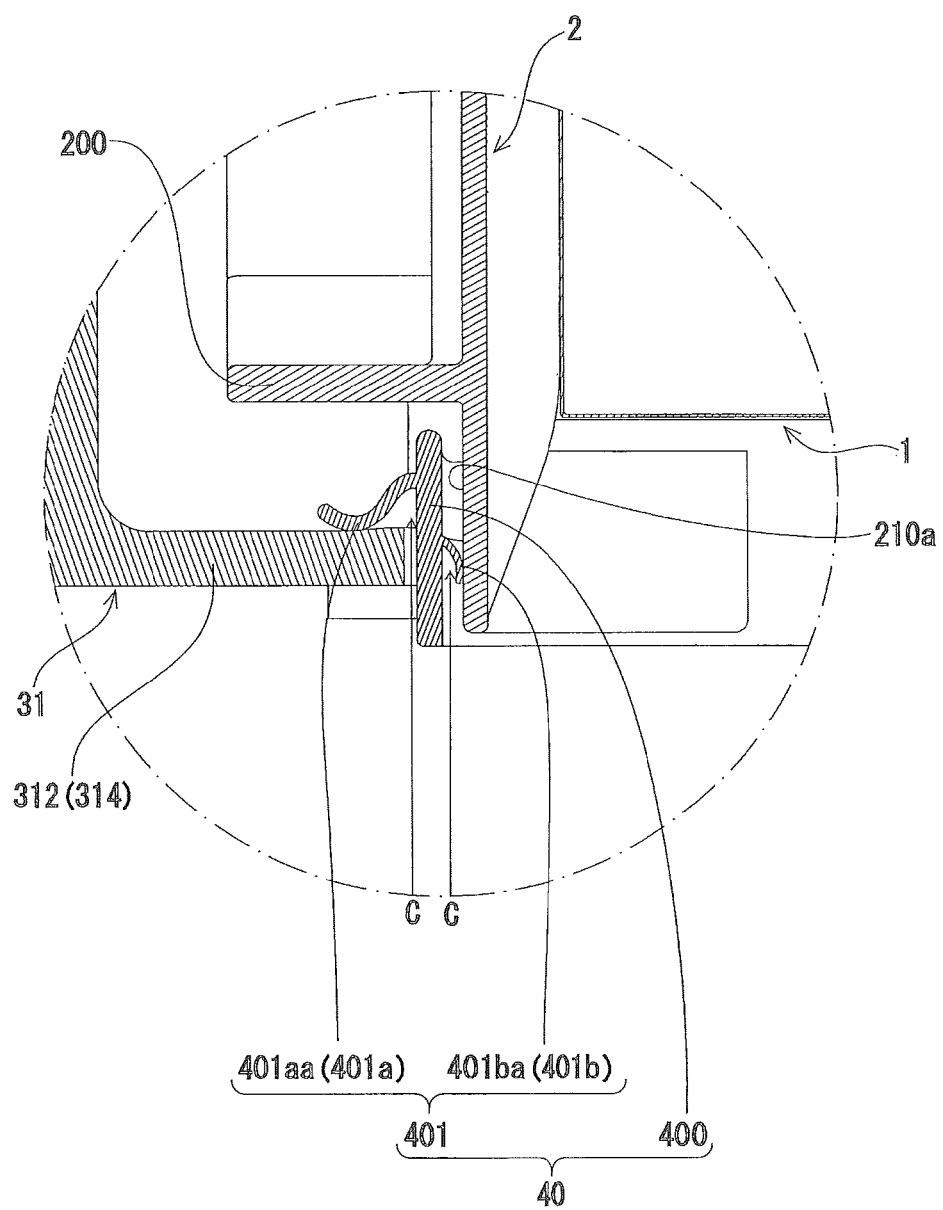
FIG. 12 is a sectional view of the battery module according to the embodiment, in a state where the flow of the cooling fluid is blocked by a seal member.

Further, the cooling fluid C attempts to inflow between the frame parts 31 and the end holders 2. However, the seal members 40 block the flow of the cooling fluid C. More specifically, the first rib part 401a blocks the flow of the cooling fluid C between the body 400 and the end holder 2, as shown in FIG. 12. Further, the second rib part 401b blocks the flow of the cooling fluid C between the body 400 and the frame part 31.

As described above, in the battery module according to this embodiment, the end holders 2 are adjacent to the electric storage devices 1, and the insulators 4 have the seal members 40 arranged between the end holders 2 and the frame parts 31 of the frame 3 (between the end holders 2 and the coupling parts 314 of the frame part 31A of the frame 3 and between the end holders 2 and the coupling parts 314 of the frame part 31B of the frame 3). Therefore, the seal members 40 block the flow of the cooling fluid C when the cooling fluid C attempts to flow on the frame 3 side over the end holders 2 (in this embodiment, the end plate 30 side of the frame 3).

Thus, the battery module can suppress the reduction of the cooling fluid C in contact with the electric storage devices 1 by suppressing the flow of the cooling fluid C on the frame part 31 side of the frame 3 over the end holders 2. Accordingly, an excellent effect of preventing a decrease in the cooling performance of the electric storage devices 1 can be achieved.

Further, the seal members 40 are configured to serve as part of the insulators 4 that have insulating properties and that are arranged between the electric storage devices 1 and the frame parts 31 of the frame 3. Therefore, the decrease in the cooling performance of the electric storage devices 1 can be prevented using the insulators 4.

Further, since the seal members 40 each have the first rib part 401a formed in the body 400 on the frame part 31 side of the frame 3 and the second rib part 401b formed in the body 400 on the end holder 2 side, the flow of the cooling fluid C through the gaps between the insulators 4 and the end holders 2 can be blocked by the first rib part 401a, and the flow of the cooling fluid C through the gaps between the insulators 4 and the frame parts 31 of the frame 3 can be blocked by the second rib part 401b. Accordingly, it is possible to suppress the reduction in amount of the cooling fluid C in contact with the electric storage devices 1 more reliably.

Further, the rib parts 401 (the first rib part 401a and the second rib part 401b) have flexibility. Therefore, the first rib part 401a can be in tight contact with the end holder 2 more reliably, and the second rib part 401b can be in tight contact with the frame part 31 of the frame 3 (the coupling part 314) more reliably.

Further, the boundaries between the end holders 2 (2A and 2B) and the end plates 30 are covered with the coupling parts 314, and the seal members 40 are arranged between the coupling parts 314 and the end holders 2. Therefore, the flow of the cooling fluid C between the end holders 2 and the end plates 30 can be blocked by the seal members 40. Accordingly, the reduction of the cooling fluid C in contact with the electric storage devices 1 can be suppressed by suppressing the flow of the cooling fluid C on the end plate 30 side of the frame 3 over the end holders 2. As a result, the decrease in the cooling performance of the electric storage devices 1 can be prevented.

In this embodiment, the second rib part 401b extends over the first abutting part 210 and the pair of second abutting parts 211 and 212 of the end holder 2 in tight contact therewith. Therefore, the flow of the cooling fluid C on the end plate 30 side of the frame 3 over the end holders 2 can be suppressed more reliably.

It should be noted that the battery module according to the present invention is not limited to the above described embodiments. It is a matter of course that various modifications can be made without departing from the gist of the present invention. Further, the configurations, methods, and the like, of various modifications described below, of course, may be optionally selected to be used for the configurations, methods, and the like, of the aforementioned embodiments.

Though not particularly mentioned in the above described embodiments, it is also possible to employ rectangular battery cells having a rectangular appearance or cylindrical battery cells having a cylindrical appearance as the electric storage devices 1. Further, secondary battery cells such as lithium ion battery cells and nickel hydrogen battery cells, primary battery cells, electric double layer capacitors, or the like may be employed as the electric storage devices 1.

Further, the first rib part 401a is formed to have an S-shaped cross section in the aforementioned embodiments. However, there is no limitation to this. For example, the first rib part 401a does not need to have such an S-shaped cross section, as long as the distal end side is pressed against the frame 3. That is, the first rib part 401a may be formed to have a linear cross section as the second rib part 401b.

Further, the second rib part 401b is formed to have a linear cross section in the aforementioned embodiments. However, there is no limitation to this. For example, the second rib part 401b may be formed to have an S-shaped cross section as the first rib part 401a as long as it is pressed against the end holder 2.

Further, the seal members 40 serve as part of the insulators 4 arranged between the electric storage devices 1 and the frame 3 (the frame parts 31) in the aforementioned embodiments. However, there is no limitation to this. For example, the seal members 40 may be formed as separate bodies from the insulators 4 (the first externally fitted part 410 and the second externally fitted part 411), or may be provided in an electric storage apparatus which does not include the insulators 4 (the first externally fitted part 410 and the second externally fitted part 411) between the electric storage devices 1 and the frame 3 (the frame parts 31).

Further, the frame part 31 has the third fringe parts 312 (the coupling parts 314) formed so as to extend between the first fringe part 310 and the second fringe part 311 in the aforementioned embodiments. However, there is no limitation to this. For example, the frame part 31 may be a frame part in which the first fringe part 310 and the second fringe part 311 are not coupled together. More specifically, the electric storage apparatus may include the frame part 31 that is composed of four independent frame parts (that is, the first fringe part 310, the second fringe part 311, and the third fringe parts 312 may be formed as separate bodies).

Further, though not particularly mentioned in the aforementioned embodiments, the external terminals 11 may be connected to bus bars, which electrically connect the external terminals to each other, by resistance welding or ultrasonic welding, instead of being connected thereto by screwing.

The electric storage apparatus and the method for producing the electric storage apparatus according to the present embodiments are as described above. However, the present invention is not limited to the above described embodiments, and the design can be appropriately modified within the scope intended by the present invention. The operational advantage of the present invention is also not limited to the foregoing embodiments. The embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

What is claimed is:

1. An electric storage apparatus comprising:
    a plurality of electric storage devices arranged in a first direction;
    an end holder adjacent to the plurality of electric storage devices in the first direction and including a first abutting surface facing away from the plurality of electric storage devices in the first direction;
    a frame sandwiching the plurality of electric storage devices and the end holder, and including an end plate; and
    a seal member comprising:
        a body arranged between the end plate of the frame and the end holder;
        a first rib part projecting from a first surface of the body and contacting the frame; and
        a second rib part projecting from a second surface of the body which is opposite the first surface, and contacting the first abutting surface.

2. The electric storage apparatus according to claim 1, wherein
    the end holder has a holder body adjacent to the plurality of electric storage devices, and
    the holder body has a flow path forming part that is formed on its surface facing the plurality of electric storage devices.

3. The electric storage apparatus according to claim 1, comprising:
    a pair of the end holders, wherein
    the frame has a pair of the end plates,
    the pair of the end plates are arranged so as to sandwich the plurality of electric storage devices and the end holders in the first direction,
    the end holders are arranged between the plurality of electric storage devices and the respective end plates, and
    the seal member is arranged between each of the end plates and the end holder facing the end plate in the first direction.

4. The electric storage apparatus according to claim 3, wherein
    the frame further has a frame part that is aligned together with the plurality of electric storage devices in a second direction orthogonal to the first direction and that couples the pair of end plates to each other,
    the frame part has a coupling part extending along a third direction that is orthogonal to both the first direction and the second direction, and
    the coupling part faces edges of the end holders in the second direction and covers boundaries between the end holders and the end plates.

5. The electric storage apparatus according to claim 4, wherein
    the seal member is arranged between the coupling part and each of the end holders and extends along the third direction.

6. The electric storage apparatus according to claim 1, wherein
    the seal member is arranged between an edge of the end holder in a second direction that is orthogonal to the first direction and an edge of the end plate in the second direction, and
    the seal member extends along the third direction that is orthogonal to the first and second directions.

7. The electric storage apparatus according to claim 1, further comprising
    an intervening member having insulating properties, the intervening member being arranged between the plurality of electric storage devices and the frame, wherein
    the seal member is formed integrally with the intervening member.

8. The electric storage apparatus according to claim 1, wherein the seal member has insulating properties.

9. The electric storage apparatus according to claim 1, wherein the first rib part comprises a flexible rib part and the second rib part comprises a flexible rib.

10. The electric storage apparatus according to claim 1, wherein the frame includes a coupling part extending in the first direction, and the body extends in a second direction orthogonal to the first direction, and
    wherein the first rib part projects from the first surface of the body in the first direction and contacts the coupling part.

11. The electric storage apparatus according to claim 1, wherein the end holder includes a first abutting part having the first abutting surface facing in the first direction.

12. The electric storage apparatus according to claim 11, wherein the body extends in a second direction orthogonal to the first direction, and
    wherein the second rib part projecting from the second surface of the body in the first direction and contacts the first abutting surface.

13. The electric storage apparatus according to claim 1, wherein the seal member is arranged between the end plate of the frame and the end holder, in the first direction.

14. The electric storage apparatus according to claim 1, wherein the seal member is formed between the frame and the plurality of electric storage devices in a second direction orthogonal to the first direction,
    wherein the body extends in a third direction orthogonal to the first and second directions, and
    wherein the first rib part projects from the body in the first direction and extends along the body in the third direction.

15. An electric storage apparatus, comprising:
    a plurality of electric storage devices arranged in a first direction;

an end holder adjacent to the plurality of electric storage devices in the first direction, and including a first abutting part having a first abutting surface facing away from the plurality of electric storage devices in the first direction;

a frame sandwiching the plurality of electric storage devices and the end holder, and including:
an end plate facing in the first direction; and
a frame part extending lengthwise in the first direction and including a coupling part; and a seal member comprising:
a body arranged between the end plate of the frame and the end holder;
a first rib part projecting from a first surface of the body in the first direction and contacting the coupling part; and
a second rib part projecting from a second surface of the body which is opposite the first surface, and contacting the first abutting surface.

16. The electric storage apparatus according to claim 1, wherein the end holder comprises a partition which projects from a surface of the end holder and away from the plurality of electric storage devices in the first direction, and wherein the first rib part is formed between the partition and the frame.

17. The electric storage apparatus according to claim 1, wherein the first rib part comprises a curved surface,
wherein the frame comprises a side surface facing in a second direction which is opposite the first direction, and
wherein the curved surface of the first rib part contacts the side surface of the frame to form a seal.

18. The electric storage apparatus according to claim 1, wherein the second rib part comprises a curved surface, and
wherein the curved surface of the second rib part contacts the first abutting surface to form a seal.

19. The electric storage apparatus according to claim 1, wherein the body of the seal member extends in a second direction which is perpendicular to the first direction,
wherein the seal member comprises a rectangular shape including a long side extending in the first direction and a short side extending in a third direction which is perpendicular to the first and second directions, and
wherein the first rib part extends in the third direction on the short side.

* * * * *